Patented Sept. 6, 1932

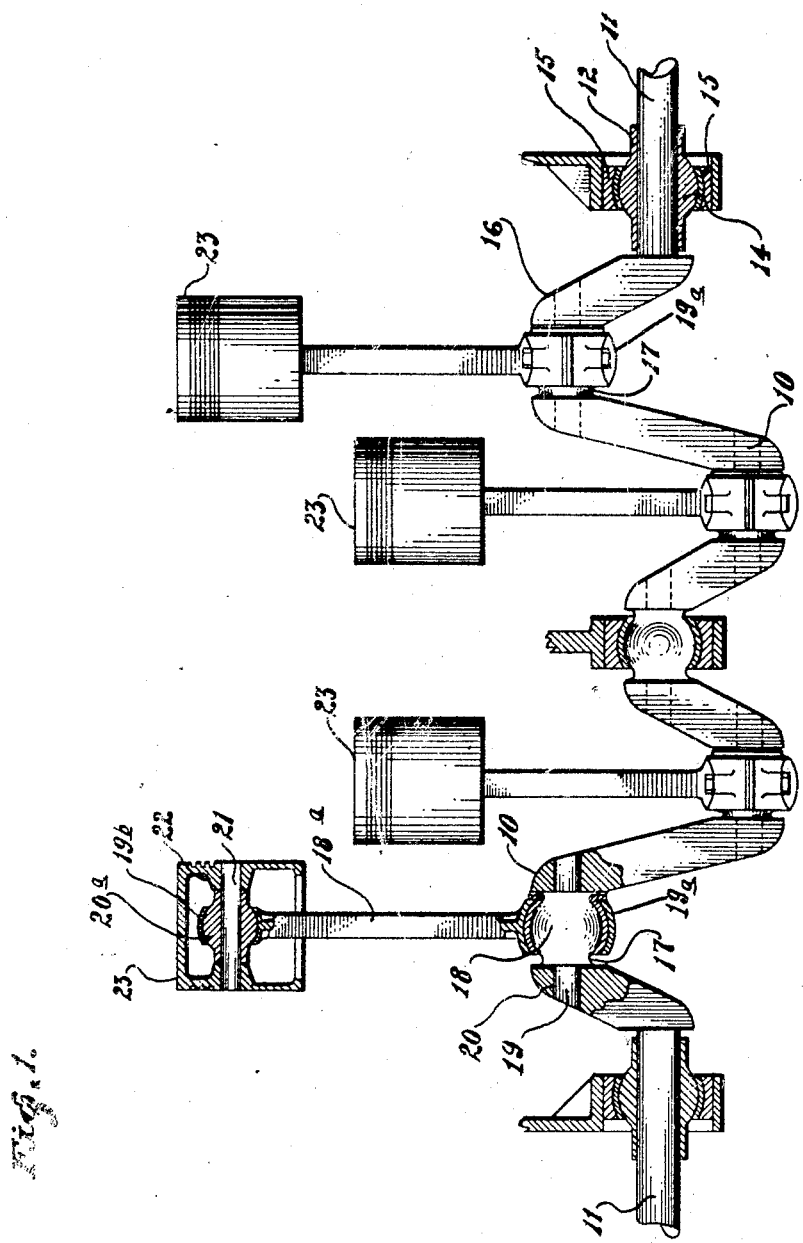

1,875,682

UNITED STATES PATENT OFFICE

CLINTON L. WALKER, OF PIEDMONT, CALIFORNIA, ASSIGNOR OF ONE-HALF TO BROOKS WALKER, OF PIEDMONT, CALIFORNIA

CRANKSHAFT MOUNTING FOR INTERNAL COMBUSTION ENGINES

Original application filed August 26, 1929, Serial No. 388,574. Divided and this application filed May 31, 1930. Serial No. 458,367.

This application is a division of my co-pending application entitled Internal combustion engine, filed August 26, 1929, and bearing Serial Number 388,574.

The invention relates to internal combustion engines and particularly pertains to a crankshaft mounting therefor and has for its principal object the provision of a crankshaft mounting for internal combustion engines which will compensate for any misalignment of the crankshaft and compensate for the difference in expansion between the crankshaft and the crank case.

In carrying the invention into practice, the crank case of the engine is provided with self-aligning bearings. Clearance is provided between these bearings and the adjacent webs of the crankshaft so as to compensate for the difference in expansion between the crank case and the crankshaft.

One form which the invention may assume is exemplified in the following description and illustrated by way of example in the accompanying drawing, in which:

The figure is a view in elevation and section of a crankshaft with the connected reciprocating parts disclosing the construction thereof.

Referring more particularly to the accompanying drawing, 10 indicates a crankshaft having cylindrical bearing portions 11 at its opposite ends. These bearing portions 11 extend through bushings 12 having spherical portions 14 journaled in spherical bearings 15. This construction enables the bushings 12 to be self-centering so that they will always remain in proper alignment with the bearing ends 11 of the crankshaft.

It is desired to point out that there is clearance at both ends of the crankshaft between the end webs or throws 16 and the bushings 12 so as to compensate for the difference in expansion between the crank case and the crankshaft.

The crankshaft disclosed in the present application is of what is known as "built up" construction, that is, the throws 16 and the crank pins 17 are formed in separate parts, preferably by drop forging. The crank pins are formed with specical bearing portions 18, the ends of which are cylindrical and reduced in diameter to form spindles 19. These spindles extend into drilled openings 20 formed in the ends of adjacent throws 16. The fit between the pins 19 and 20 is a shrink fit and I reinforce the bond between the spindles 19 and the crank throws 16 by welding a joint between the spindles and the throws around the periphery of the spindles at the point indicated in the drawing.

Connected with the crank pins 17 are connecting rods 18a, each of which is formed with a spherical split bearing 19a embracing the spherical portion 18 of the proper crank pin. At the wrist pin end of the rods 18a, each rod is formed with a spherical wrist pin bearing having a bushing 20a which has a spherical portion turnable in the bearing 19b. The bushing is drilled and reamed to receive the wrist pin 21. The bushing 20a fits tightly between the adjacent ends of the wrist pin bosses 22 on the piston 23. The wrist pin bearing of the connecting rods 18a is not split, so, in order to form the bushing 20a therein, the latter is cast directly into the wrist pin bearing.

To accomplish this, I cast the bushing in the wrist pin bearing of the rod using metallic molds to form the outer ends of the bushing and cone-shaped cores to form the opening through which the wrist pin extends. The natural shrinkage of the bushing 20a after it is cast leaves it a very loose fit in the wrist pin bearing 19b. To overcome this, I insert cone-shaped punches in the cone-shaped sockets in opposite ends of the bushing and expand the bushing by swedging at each end thereof until I effect a proper fit between the bushing and the wrist pin bearing 19b. The opening through the bushing 20a to receive the wrist pin is then reamed so that it will be a proper fit with the wrist pin 21.

By the use of this type of construction, no clearance need be provided between the ends of the bushing 20a and the ends of the wrist pin bosses 22 on the piston. This is a considerable advantage because, it prevents vibration between the ends of the wrist pin bearing of the connecting rod and the piston bosses.

The principal advantage of the spherical bearings of the crank shaft and connecting rods is that the parts will always assume proper alignment under working conditions and therefore any errors occurring in alignment during the construction and assembling of the engine will be automatically compensated for. Likewise, I find that the bearings will be more properly lubricated with this construction due to the fact that centrifugal force during the operation of the crankshaft will converge the lubricant in the greatest diameter of the spherical bearing and thus prevent the lubricant being thrown or squeezed out of the sides of the bearing.

In practice, the crank throws 16 and the crank pins 17 are made in separate parts by drop forging. The crank pins 17 are hardened and then ground to spherical form. The crank throws and the crank pins are then assembled by shrinking the spindles 19 into the drilled openings in the end of the throws. A weld is then effected at the ends of the spindles 19 between their periphery and the adjacent surface of the crank throws. This forms a tight and rigid connection between the crank pins and the throws.

To form the wrist pin bearing bushing in each connecting rod, the bushing 20a is cast directly into the wrist pin bearing and it is thereafter expanded to a proper fit. When this has been done, the bushing 20a is properly reamed to receive the wrist pin 21. The length of the bushing is such that no clearance is provided between its ends and the ends of the piston bosses. The piston is assembled on the connecting rod by arranging the wrist pin bearing and bushing in proper alignment with the piston bosses 22 and thereafter inserting the wrist pin 21 to position. This method of forming the wrist pin bearing bushing is described and claimed in my copending application entitled Wrist pin bearing, filed May 31, 1930, Ser. No. 458,366.

To assemble the connecting rods on the spherical portions 18 of the crank pins 17, the connecting rod bearings are made in halves which are assembled to embrace the spherical portion 18 of the crank pin 17.

I desire to point out that the bushing 14 at the ends of the crankshaft are self-aligning and that the main bearing at the center of the crankshaft is of the same construction as the connecting rod bearings.

During the operation of the engine, any misalignment due to faulty construction or assembly will be automatically compensated for by the universal movement permitted between the connecting rods and the crank pins and between the connecting rods and the wrist pins. This will eliminate any chattering of the wrist pin bearing in the piston and other noises caused by improper alignment of the parts.

From the foregoing, it is obvious that I have improved bearing constructions so that a built up crankshaft may be utilized and which will enable the reciprocating parts to automatically assume proper alignment in the event that some misalignment has been permitted during the construction and assembly of the parts.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an engine having a crankcase with end main bearings and an intermediate main bearing, a fixed spherical bushing in the intermediate main bearing, a crankshaft having a spherical portion mounted in the fixed spherical bushing in the intermediate main bearing, bushings mounted in the end main bearings for universal movement, said crankshaft having portions mounted in said bushings for rotative and axial movement.

2. In an internal combustion engine having a crankcase and crankshaft with cranks intermediate its ends, said crankcase formed with end main bearings, an intermediate main bearing located centrally between the end main bearings, a spherical bushing in said intermediate main bearing, said crankshaft having a spherical portion journalled in said spherical bushing, bushings mounted in the end main bearings for universal movement, the end portions of said crankshaft being rotatably and reciprocably mounted in said main bearing bushing to compensate for longitudinal difference in expansion between the crankcase and the crankshaft.

3. In an engine, a crankcase having end bearings and a spherical intermediate bearing, a crankshaft having a spherical bearing portion journalled in said intermediate bearing, and bushings mounted for universal movement in said end bearings, the ends of said crankshaft being journalled in said bushings.

CLINTON L. WALKER.